July 17, 1923. 1,462,461
F. B. CALDWELL
CONVEYER COUPLING MEANS
Filed Aug. 19, 1921
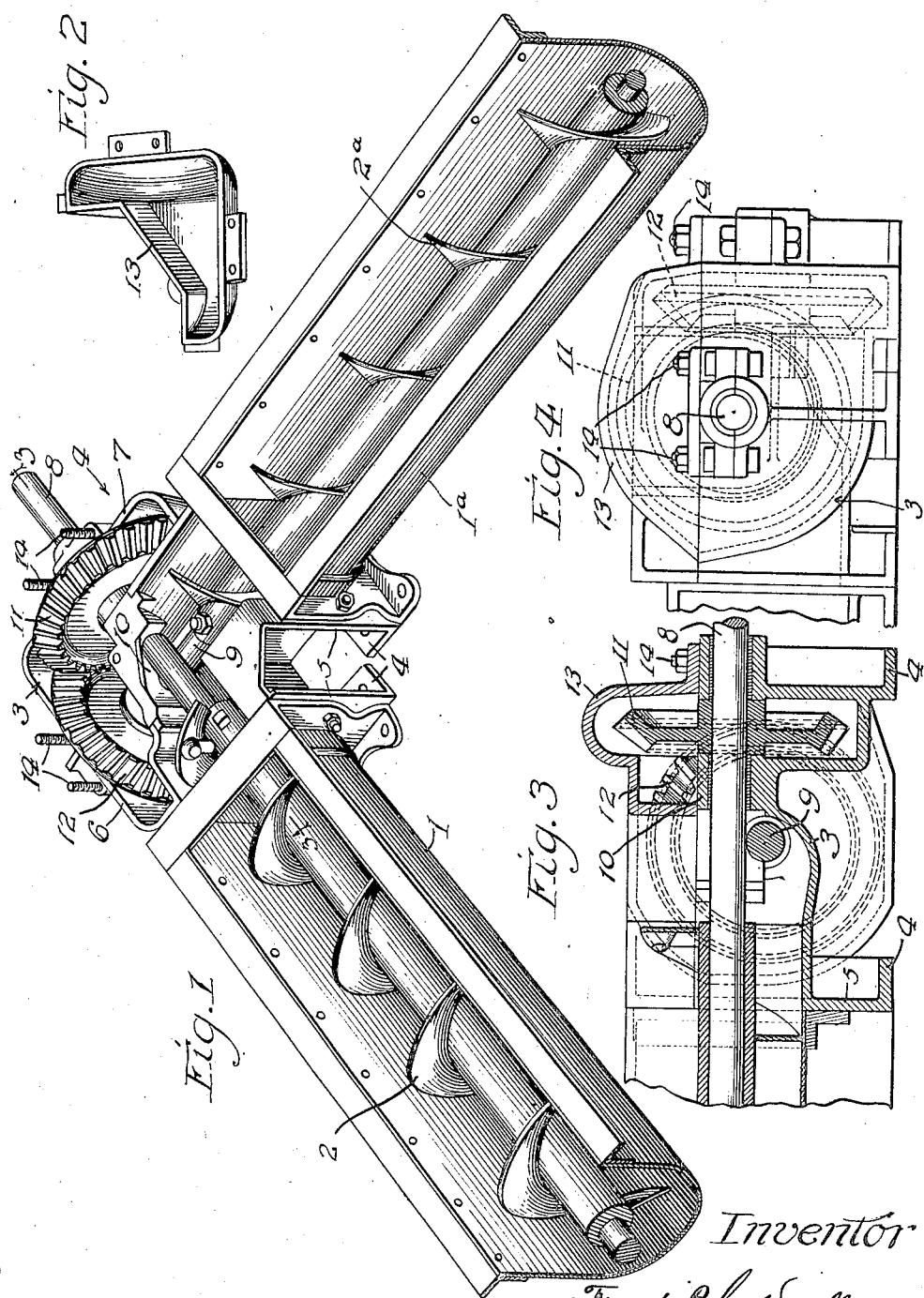
Inventor
Frank B. Caldwell Patented July 17, 1923.

1,462,461

UNITED STATES PATENT OFFICE.

FRANK B. CALDWELL, OF OAK PARK, ILLINOIS, ASSIGNOR TO H. W. CALDWELL & SON COMPANY, OF CHICAGO, ILLINOIS, A CORPORATION OF ILLINOIS.

CONVEYER-COUPLING MEANS.

Application filed August 19, 1921. Serial No. 493,602.

*To all whom it may concern:*

Be it known that I, FRANK B. CALDWELL, a citizen of the United States, residing at Oak Park, in the county of Cook and State of Illinois, have invented certain new and useful Improvements in Conveyer-Coupling Means, of which the following is a specification.

My invention relates to an arrangement of gearing and casing members for helical conveyers whereby two conveyer members arranged at a right angle may be coupled to convey material around the angle, as for instance around two sides of a room. If two conveyer shafts lying in the same horizontal plane, are coupled by means of ordinary outwardly facing bevel gears it is necessary to provide a connecting channel of appreciable length extending diagonally across the space back of the apex of the gears—that is, on the inside of the angle formed by the conveyer troughs,—and force the material therethrough, such channel itself being provided with no means for propelling the material. This arrangement in some cases is used, but is inefficient and objectionable, and under some circumstances and with some materials is impracticable. In other cases one conveyer trough has been arranged to discharge the material into a trough arranged at right angles at a lower level, but it is often desirable that the material shall be carried around the angle at the same level, and in such cases this arrangement will not answer. My present invention is designed to provide means for efficiently conveying material from the end of one conveyer trough to and through a second trough on practically the same level and at a right angle to the first trough, thus obviating the disadvantages of the previously known arrangements above mentioned. With this object and incidental advantages in the construction and arrangement of parts in view, I have designed and invented the conveyer coupling and driving mechanism illustrated in the accompanying drawings and hereinafter described in detail, the essential elements of my invention being more particularly pointed out in the appended claims.

Figure 1 of the drawing shows in perspective the end portions of two spiral conveyers provided with my novel coupling mechanism; Fig. 2 is a perspective of a cover plate for the mechanism, inverted; Fig. 3 is a section in a vertical plane indicated by the dotted line 3—3 of Fig. 1; and Fig. 4 is an outside face view of the casing of the coupling, viewed at right angles to the position of the parts as shown in Fig. 3.

The same reference characters indicate the same parts in all the figures of the drawing.

The conveyer troughs 1—1ª and spiral conveyers 2—2ª are of usual construction, except as to the manner of their connection with each other. The connecting structure, which is disposed in the outside angle between the ends of the troughs, consists of a casing formed with bearings for the two conveyer shafts and inclosing gearing connecting them, and a passageway for the material connecting the two troughs and adapted to receive the terminal portions of the two spiral conveyer blades. This casing may conveniently consist of a lower member 3 formed with base flanges 4 for attachment to the floor and side flanges 5 by means of which the flanged end members of the trough may be secured to it, and of an upper or cover member which will later be referred to again. Extending inwardly into the casing in alignment with the troughs 1 and 1ª are curved walls which form in effect extensions of such troughs marked respectively 6 and 7, the outer sides of these walls extending towards and meeting an oblique wall portion so as to form a generally diagonal partition separating a continuous passageway between the troughs from a gear compartment. This partition is formed with the diametrical lower half of a bearing for the shaft 8 of the conveyer 1 and a similar bearing for the shaft 9 of the conveyer 2ª, the upper portions of the bearings both being formed in a partition section 10 seated upon the lower portion of the partition and the bearing parts formed in it. The shaft 8, it will be observed lies closely over the shaft 9, and the bottoms and adjacent portions of the passageway between the troughs 1 and 1ª are therefore stepped or offset to the extent of the diameter of the shafts.

Between the partition wall just described and the outer wall of the casing is arranged a pinion 11 secured to the shaft 8, and similarly arranged and secured to the shaft 9 is a pinion 12, the two pinions being formed with inclined intermeshing teeth forming a skew gear connection. The outer wall of the casing is formed with substantial semi-cylindrical bearing hubs for the shafts 8 and 9 equipped with bearing caps, and preferably the bearings in both the partition and outer casing wall are provided with bushings.

The compartment of the casing member which receives the pinions is enclosed by the cover 13 hereinbefore mentioned, see Fig. 2, which may conveniently be secured to the casing by means of the bolts 14 through which the caps for the outer bearings are clamped to the bearing members below them.

It will be noted that the employment of skew gearing on the terminal portions of the crossed shafts outside the passageway for the material leaves the conveyer troughs entirely unobstructed except for the conveyer shafts, and the space between the ends of the two blades in which the material must change the direction of its travel lies substantially within the quadrant of a solid angle and is the shortest and most direct passage possible. The drop due to the crossing of the conveyer shafts is advantageous in the very short direct turn made by the material, but is so slight as not to affect the substantially horizontal arrangement of the conveyer troughs.

I claim:

1. Means for connecting horizontal screw conveyers arranged at right angles and having overlapping shafts comprising a passageway traversed by said shafts and connecting the conveyer troughs, and gearing on the ends of said shafts outside said passageway.

2. Means for connecting horizontal screw conveyers arranged at right angles and having overlapping shafts comprising a passageway traversed by said shafts and connecting the conveyer troughs, and skew gears on the ends of said shafts outside said passageway.

3. Means for connecting horizontal screw conveyers arranged at right angles and having overlapping shafts comprising a casing arranged in the outer angle formed with a passageway traversed by said shafts and connecting said troughs and also formed with a gear compartment, and intermeshing gearing in said compartment connecting the outer ends of said shafts.

4. Mechanism according to claim 3 for connecting screw conveyers in which said casing is formed with walls forming extensions of the conveyer troughs and arranged to receive the end portions of the conveyer blades.

5. Mechanism according to claim 3 for connecting screw conveyers in which said casing is formed with a partition wall between said passageway and said gear compartment and said gear compartment is equipped with a cover.

6. Mechanism according to claim 3 for connecting screw conveyers in which said casing is formed with a partition wall formed with bearings for said shafts.

7. Mechanism according to claim 3 for connecting screw conveyers in which said casing is formed with an obliquely disposed partition wall formed with semicylindrical bearings for both said shaft and a common cap piece forming a section of said partition is secured to said bearing parts.

8. Mechanism according to claim 3 for connecting screw conveyers in which said casing is formed with a partition wall between said passageway and said gear compartment and in which said shafts have bearings both in said partition and in the outer wall of said casing.

FRANK B. CALDWELL.